United States Patent Office 3,491,833
Patented Jan. 27, 1970

3,491,833
STABILIZING WATER-SENSITIVE CLAYS IN AN UNDERGROUND FORMATION
William B. Braden, Jr., Houston, Tex., assignor to Texaco Inc., New York, N.Y., a corporation of Delaware
No Drawing. Filed Dec. 5, 1967, Ser. No. 687,981
Int. Cl. E21b 43/24
U.S. Cl. 166—272                3 Claims

ABSTRACT OF THE DISCLOSURE

A method of increasing the permeability of a clay-containing body by exposure to an elevated temperature in excess of 1600° F. thereby altering the crystal lattice of the clays contained therein.

Background of the invention

The present invention relates to the treatment of clay-containing formations. More particularly, this invention relates to a method of treating subterranean formations containing clay or clay-like materials by thermal means to increase the water permeability and/or to restore the water permeability of clays which have previously been damaged by water.

In modern day production of hydrocarbons from underground formations, it has become common practice to apply secondary recovery techniques to the hydrocarbon-bearing formations in order to recover therefrom additional quantities of hydrocarbons. Among the more common methods currently employed in secondary recovery operations are those involving water, steam or gas flooding and combinations thereof. One of the more serious problems encountered in secondary recovery operations with water or steam flooding procedures is that the underground hydrocarbon-bearing formation also contains clay or clay-like bodies which exhibit a tendency to swell or disperse on contact with water. Treatment of such a formation with water or low quality steam generally results in swelling of the clays by adsorption of the water with the concomitant result that the water permeability of the formation is materially decreased. The decrease in the water permeability in the formation limits the amount of hydrocarbons which may be recovered therefrom by means of the secondary recovery procedures.

In order to accomplish successful water or steam floods in hydrocarbon-bearing formations, it is necessary that the zone around the well bore remain permeable to the fluid being injected thereinto. This has been accomplished in clay-containing formations by either maintaining the ionic concept of the injected fluid high enough to prevent dispersion of the clays or by irreversably treating the clays with substituted nitrogen salts, such as guanidine hydrochloride. Such treatment of the formation has been found to be both expensive and limited in the amount of permeability increase rendered therefrom. The invention herein disclosed provides an improved method for greatly increasing the permeability of a clay-containing formations without the usual chemical treatment.

Summary of the invention

The invention herein disclosed provides an improved method for increasing the permeability of a subterranean hydrocarbon-bearing formation by thermal means. Exposure of the formation to temperatures in excess of 1600° F. produces susbtantial increases in the permeability of the formation, thereby enabling the recovery of hydrocarbon materials from a formation that was previously impermeable and relatively non-productive.

The principal advantage made possible by the use of this invention over prior art methods is that a simple and effective method is provided by which a substantial increase in permeability is produced. It is known in the prior art that exposure of subterranean formations to elevated temperatures produces some increase in the permeability thereof. By the method of this invention, the clay-containing formation is exposed to a temperature sufficiently high to alter the crystal lattice of the clays in the formation, thereby providing a completely unexpected increase in permeability over those found in prior studies. Further, the method of this invention desensitizes the formation to water such that subsequent exposure thereof to fresh water produces little or no decrease in permeability.

Accordingly, it is a primary object of this invention to provide a simple and effective method for increasing the permeability of a clay-containing body.

A further object of this invention is to provide an improved method for desensitizing clay containing formations to the exposure of water.

These and other objects, advantages and features of the invention will become more apparent from the following description of one embodiment of the invention.

Description of the preferred embodiment

With the method of this invention, clay-containing formations are effectively treated to improve the permeability and/or porosity thereof by means of exposure to an elevated temperature. Such improvement is beneficial with regard to permeability to subsequent injections of both liquid and gas, or any combination thereof, e.g. low quality steam. In addition, treatment in accordance with the method of the present invention is also applicable to the restoration of the water permeability of formations previously damaged on contact with water. Particularly adaptable to the treatment of this invention is a petroleum producing formation which evinces or has experienced a water block in the vicinity of the producing well bore. This water block or zone of reduced oil permeability may have been brought about, after the well has been shut in, by the injecting of water back into the producing formation, in which event, a producing formation in the zone immediately adjacent or surrounding the well bore will contain a substantial amount of water or will be substantially saturated therewith, and will evince a low oil permeability.

Another use of the method of this invention consists of the treatment of a well bore traversing a formation, wherein the hydrocarbons are in a highly viscous state and the formation is relatively impermeable, with a suitable heating device to achieve temperatures in excess of 1600° F. Such temperature may be achieved also by an in situ combustion process. When it is desired to treat only in the immediate vicinity of the well bore, an electrical, gas or chemical downhole heater may be utilized. Combustion supporting gases, such as air, may be utilized whereas methane, carbon dioxide and flue gas provide a suitable heating medium although others are not precluded. After sufficient exposure of the formation to an elevated temperature, permeability increases become evident, and the hydrocarbon may then be produced therefrom more readily.

The method of this invention has further utility as a pretreatment process prior to a secondary recovery operation utilizing either steam injection or a liquid flood. Such treatment is most beneficial where a fluid having a pH value in excess of 7 is to be used as the drive fluid, since such a fluid has a tendency to cause dispersion of the clays and severely damage the formation. The well bore in the vicinity of the hydrocarbon bearing formation is treated by thermal means in order to increase the permeability thereof. Subsequent steam or liquid flooding, by means well known in the art, may then be accomplished without the normal associated clay swelling and/or dispersion. Such would permit more effective recovery of the hydrocarbon materials, since blocking or plugging of the formation by the flooding fluid is precluded or reduced, thereby allowing easier penetration of the formation by the flooding fluids. In the event that the formation is not exposed to an elevated temperature prior to the secondary recovery injection fluid being introduced thereinto, and such operation causes a decrease in the permeability of the formation, the method of this invention may be utilized successfully. Under these circumstances, the injection of the fluid would be discontinued and a heater would be introduced into the well bore in order to generate a temperature sufficient to increase the permeability of the damaged formation and permit subsequent recovery of hydrocarbons. Subsequent to the restoration of the well bore by these thermal means, the secondary recovery injection fluid flow into the injection well may be initiated again.

The following by way of example is explanatory of the method of this invention. Tests were conducted using core plugs from the Sespe Zone, South Mountain Field, Ventura County, Calif., to determine the effects of heat treatment on the permeability thereof. Six core samples, taken from various depths in the formation, were subjected to different temperature levels in order to determine the effect upon permeability. The plugs were cut into cylinders 2.2 centimeters in diameter and 2.2 centimeters in length. The mineral composition of the samples was determined by an X-ray diffraction analysis and is represented in Table I below, with the percentage of the elements present indicated for the respective depth of each sample.

TABLE I.—ESTIMATED MINERAL COMPOSITION OF UNTREATED SAMPLES

| Sample | 1,746 ft., percent | 2,851 ft., percent |
| --- | --- | --- |
| Montmorillonite | 9 | 7 |
| Illite and Mica | 5 | 4 |
| Chlorite and Kaolinite | 3 | 3 |
| Quartz | 42 | 58 |
| Potassium Feldspar | 17 | 14 |
| Plagioclase | 24 | 14 |

The six sample plugs subjected to permeability tests were heated by different methods to the temperature levels listed in Table II. Plugs 1 and 2 were heated in a muffle furnace to a temperature of approximately 1460° F. and maintained thereat for a period of approximately 20 hours. A gas flame burner was used to heat plugs 3 and 4 to a temperature of 1600° F., the plugs being maintained over the flame for a period of 1 hour. The temperature measurements in the above two tests were made with an iron-constantan thermocouple. The other plugs, 5 and 6, were placed in the center of an annular chamber which was surrounded by charcoal that had been saturated with kerosene. Air was injected into the charcoal to further combustion and generate the temperature indicated in Table II. The plugs were exposed to a temperature of 1957° F. for a period of approximately 10 minutes, the temperature then being reduced to approximately 1600° F. for a period of approximately 1½ hours. Temperature measurements were made with a sheathed chrome-alumel thermocouple suspended in the chamber and spaced adjacent the plugs.

Permeability testing of the plugs was conducted both prior and subsequent to the heat treatment. Dry nitrogen, at constant pressure, was used to determine the air permeability. Determination of liquid permeability was accomplished by utilizing distilled water at a constant flow rate. All permeability measurements were made at essentially atmospheric pressure and at room temperature. Plugs 1, 4 and 6, as represented in Table II, were subjected to the heat treatment without any prior chemical saturation or treatment. Plugs 2 and 5 were saturated with an aqueous solution of potassium chloride having a salt concentration of 30 grams/100 ml. of solution prior to heat treatment, since potassium chloride solutions have been reported as improving permeability prior to heat treatment. Plug 3 was damaged prior to use and was saturated with 0.6% solution of $AlCl_3$ in methanol prior to heat treatment. The final water permeability in all plugs, where determined, remained constant after about 50 pore volumes of distilled water had been injected, whereas the air permeability measurement remained constant almost immediately after initiating flow, and it is these steady state values which are reported in Table II.

TABLE II

| Core section | Depth (feet) | Treatment Temp. (° F.) | $N_2$ permeability before treatment (md.) | Water permeability before treatment (md.) | $N_2$ permeability after treatment (md.) | Water permeability after treatment (md.) | Ratio of original $N_2$ permeability to $N_2$ permeability after treatment |
| --- | --- | --- | --- | --- | --- | --- | --- |
| 1 | 2,851 | 1,460 | 30.6 | | 71.5 | 30.9 | 2.3 |
| 2 [1] | 1,746 | 1,460 | 25.4 | | 150.0 | 119.0 | 4.7 |
| 3 [2] | 2,851 | 1,600 | | 0.75 | 76.0 | 61.7 | |
| 4 | 2,851 | 1,600 | 10.7 | | 68.0 | | 6.4 |
| 5 [1] | 1,746 | 1,957 | 7.3 | | 6,700 | 15,400 | 918 |
| 6 | 1,746 | 1,957 | 2.4 | | 11,950 | 32,700 | 4,980 |

[1] Plugs were saturated prior to heat treatment with an aqueous solution of KCl (30 gm./100 ml.).
[2] Water damaged plug was treated prior to heating with a 0.6% solution of $AlCl_3$ in methanol.

As is evident from Table II, an almost 5,000 fold increase over the original permeability was displayed by the unsaturated plug exposed to a temperature of 1957° F. The plug saturated with potassium chloride solution and heat treated at the same temperature also showed a marked increase in permeability. However, its magnitude was not as great as in the unsaturated plug. Similar increases can be expected also from treatments with an aqueous solution selected from the group consisting of halides of alkali metals, halides of alkaline earth metals and combinations thereof. It was also noted that the water permeability of the plugs exposed to a temperature of 1957° F. surpassed that of air permeability.

The plugs treated at 1600° and 1957° F. were considerably more friable after heat treatment and it was evident that visible fracturing occurred. It is likely that a large percentage of the observed permeability increase was due to this fracturing. Subsequent exposure of the treated core plugs to fresh water did not decrease the permeabilities indicated in Table II and there appeared to be no other adverse characteristics produced by such exposure. This indicated an irreversible change in the water sensitive clays. Subsequent X-ray analysis of one plug indicated that the montmorillonite clay was converted to an amorphous nonhydratable form upon heating.

Thus, there has been shown and described an improved method of treating an underground formation by thermal means in order to produce increases in the permeability thereof.

Other modifications and variations, as hereinbefore set forth, may be made without departing from the spirit and

I claim:

1. A method of improving recovery of hydrocarbons from a subterranean hydrocarbon-bearing formation containing water-sensitive clays and traversed by at least one well which comprises stabilizing said formation by exposing said formation in the immediate vicinity of said well to a temperature in excess of 1600° F. for a period of time of at least 10 minutes wherein said clays are converted to amorphous non-hydratable forms thereby reducing the tendency of said clays to swelling upon subsequent contact with aqueous fluids, and thereafter producing hydrocarbons containing aqueous fluids from said formation.

2. The method of claim 1 which incluudes the additional step of introducing an aqueous fluid into said formation through said well and recovering hydrocarbons from said formation.

3. The method of claim 1 wherein said well is an injection well and which includes the additional steps of introducing a drive fluid into said formation via said injection well and recovering hydrocarbons from said formation through a second well.

References Cited

UNITED STATES PATENTS

| | | | |
|---|---|---|---|
| 2,642,943 | 6/1053 | Smith et al. | 166—11 |
| 2,685,930 | 8/1954 | Albaugh | 166—39 |
| 2,796,935 | 6/1957 | Bond | 166—39 |
| 3,058,671 | 10/1962 | Billue | 106—72 X |
| 3,224,892 | 12/1965 | Hemstock | 106—72 X |
| 3,237,692 | 3/1966 | Wallace et al. | 166—40 |
| 3,292,702 | 12/1966 | Boberg | 166—40 |

OTHER REFERENCES

Moore, John E., How to Combat Swelling Clays, in the Petroleum Engineer, March 1960, pp. B–96, B–98 and B–99 relied on.

Smith, Haldon J., 15 Practical Ways to Improve Steam Soak Performance, in World Oil, 163(7), December 1966, pp. 67–71.

CHARLES E. O'CONNELL, Primary Examiner

IAN A. CALVERT, Assistant Examiner

U.S. Cl. X.R.

166—302